United States Patent [19]

Wollich

[11] 4,054,778

[45] Oct. 18, 1977

[54] SOLID STATE ELECTRONIC OVEN CONTROL SYSTEM

[75] Inventor: Ferid Wollich, Wauwatosa, Wis.

[73] Assignee: M & M Enterprises, Inc., Milwaukee, Wis.

[21] Appl. No.: 591,358

[22] Filed: June 30, 1975

[51] Int. Cl.$^2$ .......................... A21B 1/00; H05B 1/02
[52] U.S. Cl. .................................. 219/413; 219/465; 219/494; 219/501; 219/505
[58] Field of Search ............... 219/412, 413, 490, 494, 219/497, 499, 501, 504, 505, 407, 323, 307

[56] References Cited

U.S. PATENT DOCUMENTS

| | | | |
|---|---|---|---|
| 2,914,644 | 11/1959 | Holtkamp | 219/413 |
| 3,003,048 | 10/1961 | Scott | 219/412 X |
| 3,800,123 | 1/1973 | Maahs | 219/413 X |
| 3,842,243 | 10/1974 | Gregory | 219/501 |

*Primary Examiner*—Elliot A. Goldberg
*Assistant Examiner*—Fred E. Bell
*Attorney, Agent, or Firm*—Keith D. Beecher

[57] ABSTRACT

A solid state electronic control system for a cooking oven is provided which is particularly adapted for cooking meat. The control system includes a first heat sensor which monitors the internal temperature of the oven, and it also includes a second heat sensor in the form of a probe which is inserted into the meat itself for monitoring the internal temperature of the meat. The control system can be set to different oven temperatures, and it operates automatically to maintain the oven to the selected temperature until the internal temperature of the meat reaches a particular level, as sensed by the probe. Then, the control system causes the oven temperature to drop gradually to a "hold" level as the meat is being cooked, and then to hold the oven temperature at the hold level until the meat is removed from the oven.

6 Claims, 7 Drawing Figures

SOLID STATE ELECTRONIC OVEN CONTROL SYSTEM

BACKGROUND OF THE INVENTION

The control system of the invention is particularly suited to operate in conjunction with cooking and holding ovens of the type described in U.S. Pat. Nos. 3,521,030 and 3,800,123, both of which are assigned to the present assignee.

The oven described in the above-mentioned patents includes one or more electric cables encased in the walls of the oven, and which extend around the interior compartment. The oven described in the patents includes an appropriate electric circuit for energizing the electric cable to cause it to generate heat in the oven. The circuit includes an appropriate timer which serves to reduce the current flow in the cable after a preset time interval, so as to reduce the internal oven temperature from a cooking level to a holding level. As described in the patents, the cooking temperature and holding temperature in the oven may be preset by the user, and the time of the cooking interval may also be preset. An important feature of the oven described in the patents is that when the cooking cycle is completed, the oven automatically drops its internal temperature to a desired holding level which is preset by the user, so that there is no need to transfer the food from the oven to a holding warmer.

The solid state control system of the present invention is advantageous in that it does not depend on any particular time interval to establish the cooking cycle. Instead, the control system includes a probe which is inserted into the meat itself, and the cooking interval is determined by the internal temperature of the meat, so that the meat, in all instances, is cooked to exactly the degree desired, regardless of ambient conditions, and is held in a warm state within the oven until needed.

By the system of the invention, the meat is first cooked at a preset temperature in the oven until a predetermined internal meat temperature is reached, and then the oven temperature is automatically gradually reduced for several hours while the meat is being cooked. This gradual reduction in oven temperature continues until a particular holding temperature of, for example, 138° F is reached, and the oven is maintained at the holding temperature until the meat is removed. This holding temperature of 138° F has been found to be appropriate for maximum enzyme action for tenderizing the meat while preventing additional cooking or bacteria growth.

By the use of the control system of the invention, various types of meats can be cooked to a desired state and held hot until needed, on a completely automatic basis, and merely by placing the meat in the oven, inserting a probe into the meat, and pushing a selected pushbutton. The cooking cycle is determined, as mentioned above, not on a time basis, but on the basis of the actual internal temperature of the meat, so that under all conditions, the user has complete assurance that the meat will be cooked to exactly the state selected by him, as determined by the actuated pushbutton.

DETAILED DESCRIPTION OF THE ILLUSTRATED EMBODIMENT

Figure 1:
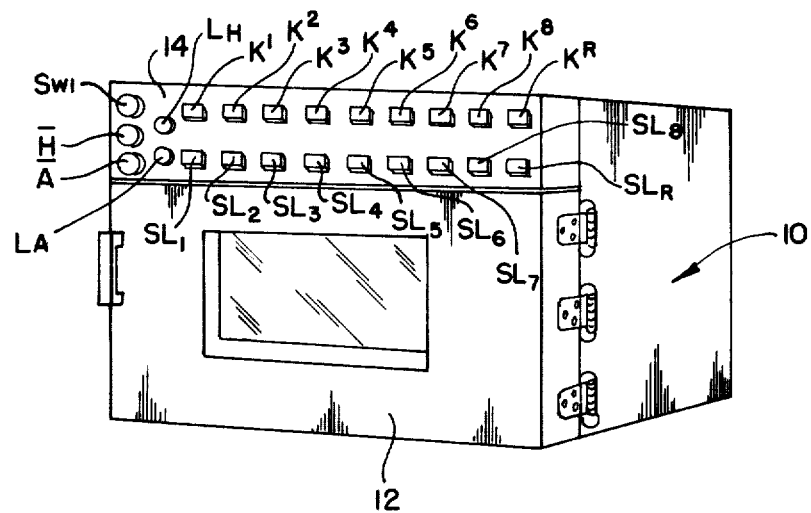
FIG. 1 is a perspective representation of an oven which may be controlled by the electronic solid state control system of the present invention.

As illustrated in FIG. 1, an oven designated 10 which may be controlled by the control system of the invention, may have a generally rectangular shape, and it may be equipped with a front door 12. A control panel 14 may be provided, on which the various operating controls for the oven are mounted.

Figure 2:
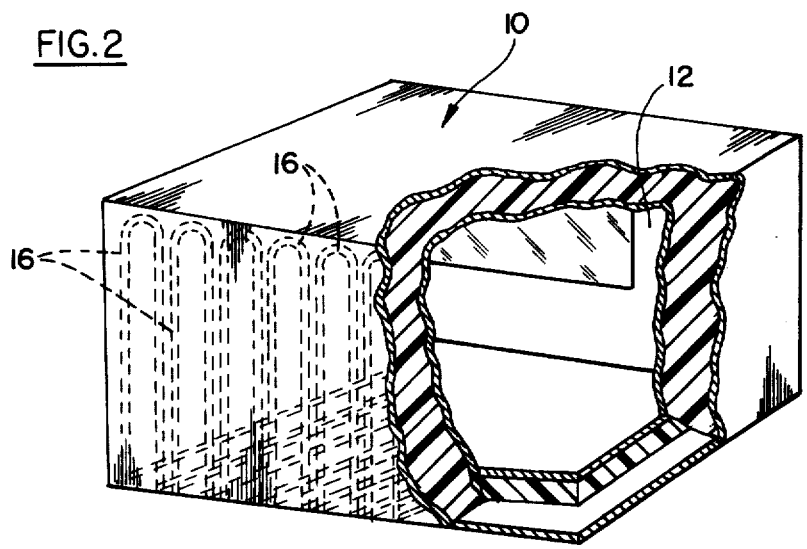
FIG. 2 is a rear perspective view of the oven of FIG. 1, partly broken away to reveal an internal electric cable which is used as a heating element for the oven.

One or more appropriate electric cables 16 (FIG. 2) are mounted in the wall of the oven 10, as described more fully in the aforementioned patents, and the control system of the invention serves to control the electric current in the cable 16 so as to provide for the automatic control of the appropriate cooking of meat within the oven, and for establishing a holding temperature in the oven after the meat has been cooked.

Figure 3:
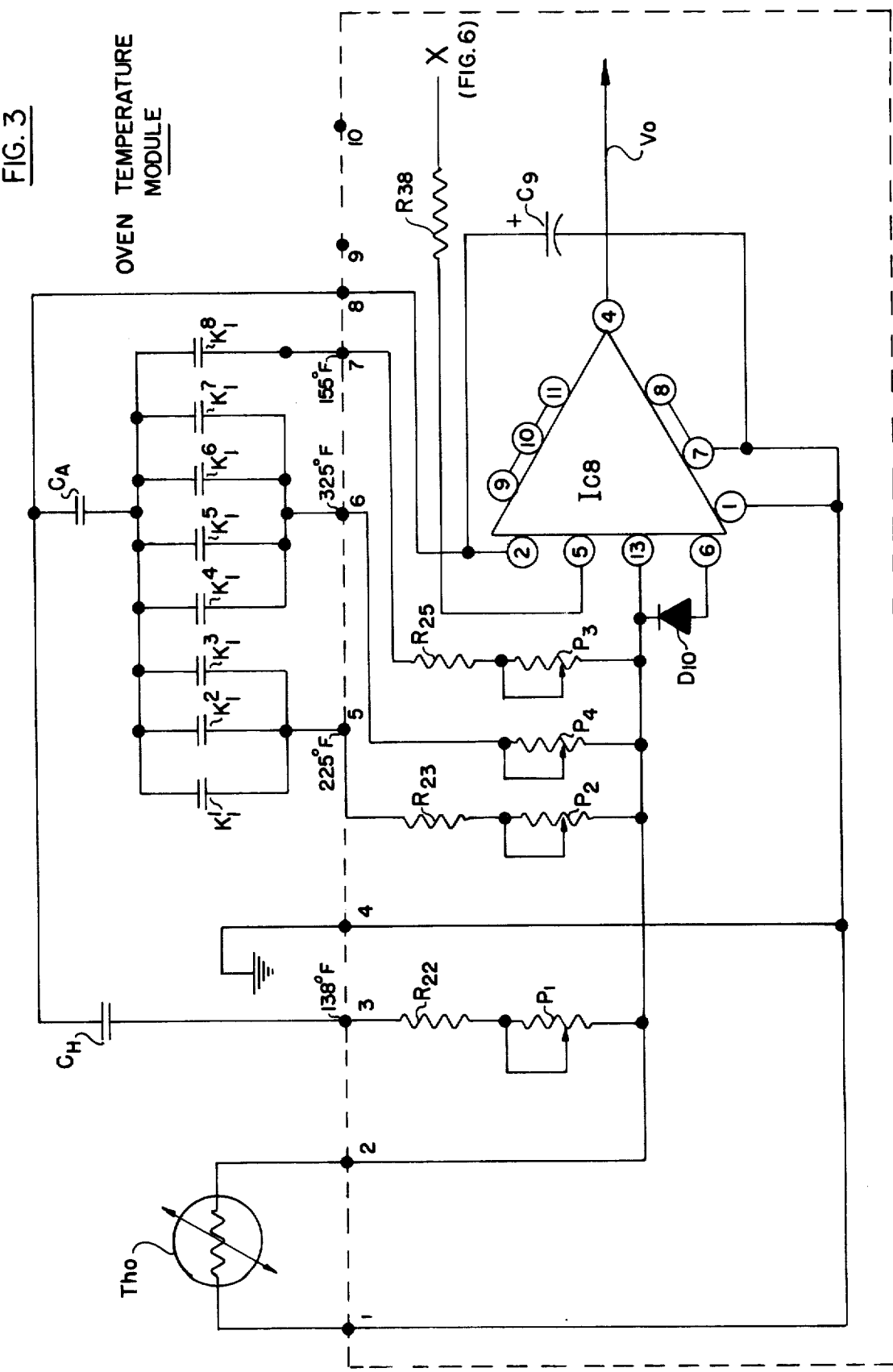
FIG. 3 is a circuit diagram of an oven temperature module which is included in the control system of the invention, and which provides an indication of oven temperature.

The control system of the invention includes an oven temperature module illustrated in FIG. 3 which, as its name indicates, controls and monitors the oven temperature. This is achieved by sensing the oven temperature by means of a thermistor Tho, or other appropriate temperature sensor. The thermistor is part of a voltage divider composed of a plurality of potentiometers P1, P2, P3 and P4, any of which can be selected by actuation of the corresponding pushbutton switches $K^1$–$K^8$ which, as shown in FIG. 1, are mounted on the control panel 14. These pushbutton switches have multiple contacts, one group of which is designated $K^1_1$–$K^8_1$ in FIG. 3.

Each of the four potentiometers P1, P2, P3 and P4 is adjusted to correspond to the equivalent resistance of the thermistor Tho at a specified temperature. For example, the potentiometer P1 is adjusted to correspond to the equivalent resistance of the thermistor at a temperature of 138° F; the potentiometer P2 is adjusted to correspond to the equivalent resistance of the thermistor Tho at a temperature of 225° F; the potentiometer P4 is adjusted to correspond to the equivalent resistance of the thermistor Tho at a temperature of 325° F; and the potentiometer P3 is adjusted to correspond to the equivalent resistance of the thermistor at a temperature of 155° F.

The potentiometer P1 is connected through a 18 kilo-ohm resistor R22 to a pair of relay contacts $C_H$; the potentiometer P2 is connected through a 2.2 kilo-ohm resistor R23, and through the pushbutton contacts $K^1_1$, $K^2_1$ and $K^3_1$ to a pair of relay contacts $C_A$; the potentiometer P4 is connected directly through pushbutton contact $K^4{}_1$, $K^5{}_1$, $K^6{}_1$ and $K^7{}_1$ to the relay contacts $C_A$; and the potentiometer P3 is connected through a 5.6 kilo-ohm resistor R25 and through the pushbutton contacts $K^8{}_1$ to the relay contacts $C_A$.

As will be described, the logic circuitry of FIG. 7 closes the contacts $C_A$ during the cooking cycle to introduce one of the three potentiometers P2, P3, P4 into the active circuit, depending upon which of the pushbutton contacts is closed; and at the end of the cooking cycle the relay contacts $C_A$ are opened, and the relay contacts $C_H$ are closed by the logic circuit to introduce the potentiometer P1 into the active circuit when the internal temperature of the meat reaches a particular value, so that the oven temperature is gradually dropped to the holding temperature of 138° F.

The oven temperature module of FIG. 3 includes an integrated circuit element $Ic_8$, which may be of the type presently designated CA3059, and which acts as a zero crossing switch. The thermistor Tho is connected across the pins 1 and 13 of the element, and the relay contacts $C_A$ and $C_H$ are connected to pin 2. A diode D10 is connected between pins 13 and 6. Pin 5 of the element $Ic_8$ is connected to a terminal X of the alternating current line in FIG. 6. Pins 9, 10 and 11 are connected together, as are pins 1, 7 and 8. A 220 microfarad capacitor C9 is connected across pins 2 and 7. The output of the zero crossing switch $Ic_8$ is derived from pin 4, and is designated $V_0$. The element $Ic_8$ is energized by power applied to pin 5 and resistor R38, and derived from terminal X in the power supply of FIG. 6.

So long as the active potentiometer resistance is lower than the resistance of the thermistor Tho, pulses are developed at the output of the element $Ic_8$, as designated $V_0$, each pulse, for example, being 100 microseconds wide and occurring at the zero crossing of the line voltage applied to the pin 5. As the oven temperature gradually comes up to the desired level, the resistance of the thermistor Tho will decrease until a balanced condition is reached, at which time the pulses $V_0$ produced at the output of the element $Ic_8$ are terminated.

Figure 7:
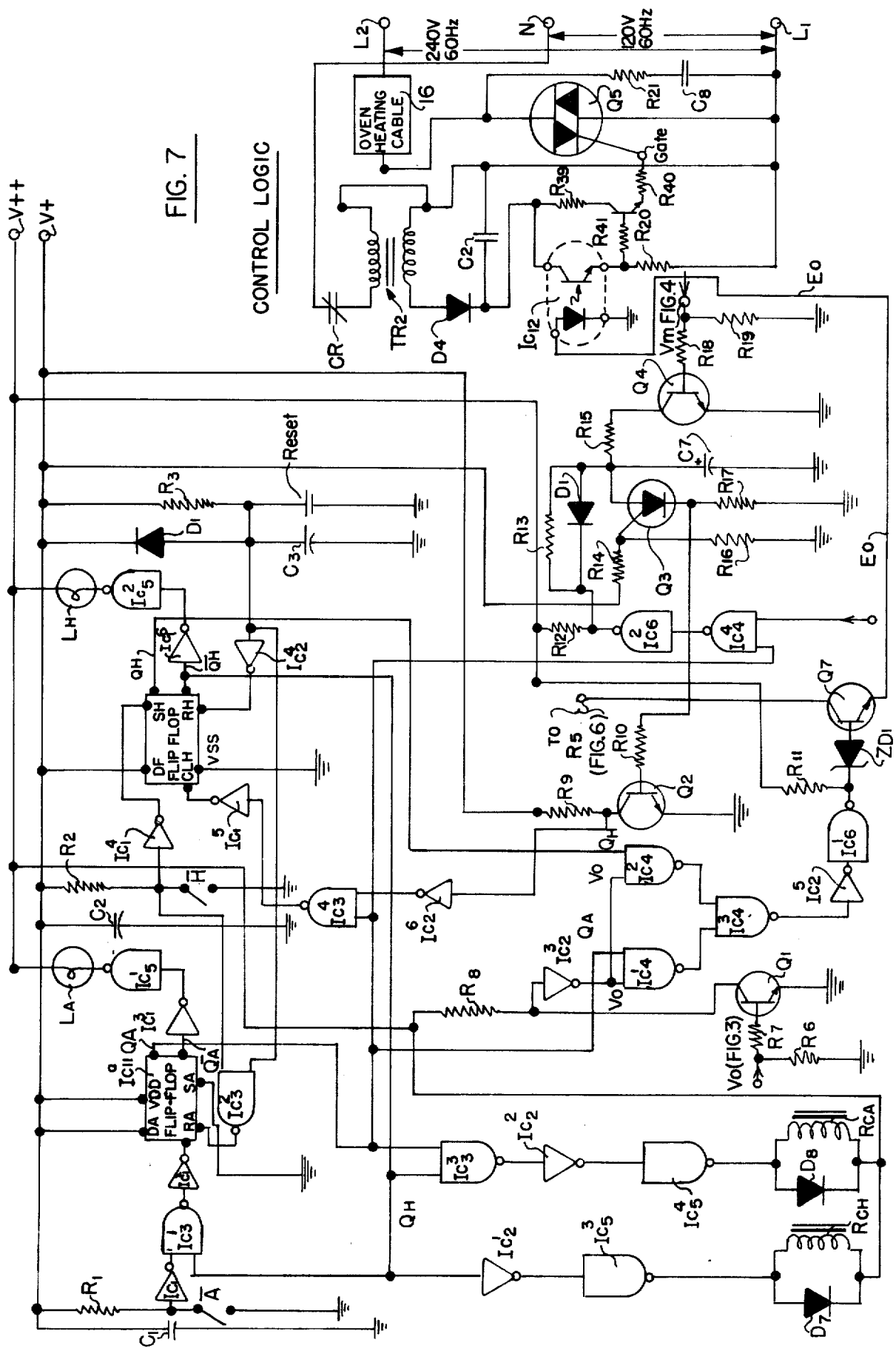
FIG. 7 is a logic diagram of the remainder of the solid state control system of the invention.

The pulses $V_0$ from the oven temperature module of FIG. 3 are introduced to the base of a grounded emitter NPN transistor Q1 in the logic circuit of FIG. 7 through a 2.2 kilo-ohm resistor R7, as these pulses appear across a grounded 680 ohm resistor R6. The transistor Q1 may be of the type presently designated 2N3859.

As shown in FIG. 7, the oven heating cable 16 is connected across the usual 120/240-volt 60 Hz power line in series with a load power switching device Q5. The device Q5 may be a 25 amp 400-volt insulated stud, triac, mounted on a heat sink. The heat sink may have a thermal resistance of 1.6° C/W to provide adequate cooling for the triac. The triac may be of the type presently designated Q4025D. A 100 ohm resistor R21 and 0.1 microfarad capacitor C8 are connected in series across the triac as a transient protective network, to prevent spurious firing of the triac due to voltage transients on the power line. An optoisolator IC12 couples the $E_o$ lead from the emitter of transistor Q7 to an NPN transistor Q8. The collector of transistor Q8 is connected to the secondary winding of a transformer $TR_2$ through a 56 ohm resistor R39 and through a diode D4. The other side of the winding is connected to triac Q5. A capacitor C2 of 470 microfarads is connected across the winding. The output terminals of IC12 are connected to the capacitor and to the junction of a pair of resistors R20 and R41 of 2.2 kilo-ohms and 100 ohms, respectively. Resistor R20 is connected to the triac Q5 and resistor R41 is connected to the base of transistor Q8. The emitter of transistor Q8 is connected through a 5.6 ohm resistor R40 to the gate of triac Q5.

The primary winding of transformer TR2 is connected through normally open contacts CR across the N, L1 terminals of the 120-volt, 60 Hz source, whereas the triac Q5 is connected with the cable 16 across the 240-volt 60 Hz terminals $L_1$, $L_2$. The transformer TR2 serves as a power source for opto-isolator IC12 and the triac gate-driver transistor Q8. Relay $R_R$ is shown in the power supply circuit of FIG. 6, and it is energized only when switch SW1 (FIG. 1) on the front panel of the control unit is turned on. When the contacts CR close, the primary winding of the transformer $TR_2$ is connected across the 120-volt, 60 Hz source, so that the triac gate driver is energized only when the switch is "on".

The opto-isolator IC12 serves to isolate the control common lead from the 240-volt 60 Hz line. Transistor Q8 serves as a buffer amplifier to drive the gate of triac Q5 by a 100 Ma, 3-volt, 100 microsecond pulse train.

So long as the oven temperature module of FIG. 3 is generating pulses $V_0$, indicating that the oven still has not reached the present temperature, the transistor Q1 will pass the pulses through logic circuitry to be described, and through a line driver NPN transistor Q7 to fire the triac Q5 through the circuit described above. Since the pulses $E_o$ driving the triac Q5 are generated by the element $Ic_8$ in the module of FIG. 3 at the zero crossing of the line voltage, the effects of interfering noise are materially reduced.

Thus, the 100 microsecond pulses $E_o$ generated by the zero crossing switch element $Ic_8$ in the oven temperature module of FIG. 3 are applied to the opto-isolator IC12 by the line driver emitter follower Q7, which transmits the pulses to the gate of the triac Q5. Thus, a low source impedance is provided for driving a mostly capacitive transmission line between the driver Q7 and the input of opto-isolator IC12, so that it is supplied with 100 microsecond, 1.5-volt peak-to-peak, 10 milliamp pulses $E_o$.

As shown in FIG. 7, the collector of transistor Q1 is connected through an inverter $IC^3{}_2$ to a pair of "nand" gates $IC^1{}_4$ and $IC^2{}_4$, the outputs of which are connected to a further nand gate $IC^3{}_4$. The output of the nand gate $IC^3{}_4$ is connected through a further inverter $IC^5{}_2$ to a nand gate $IC^1{}_6$, the output of which is connected through a Zener diode ZD1 to the base of the line driver Q7. The nand gates are of the HNIL open collector quad type. The Zener diode ZD1 has a threshold voltage of 3.9-volts, and it prevents a false triggering of the driver emitter by the output of the nand gate $IC^1{}_6$. The junction of the output of nand gate $IC^1{}_6$ and Zener diode ZD1 is connected through a 3.9 kilo-ohm resistor R11 to the positive potential lead designated V++, which extends from the power supply of FIG. 6, which will be described.

Therefore, whenever the output of the nand gate $IC^1{}_6$ goes high, indicating the presence of a pulse $V_0$ from the oven module of FIG. 3, the transistor Q7 will be driven into saturation, to drive the triac Q5 to its conductive state. This occurs during line voltage zero transition, as explained above, thus reducing switching transient noise. The triac Q5 then remains conductive during the remainder of the half-cycle. The transistor Q1 serves as a level shifter to meet the requirements of interfacing the level crossing switch $Ic_8$ of the oven temperature module to usual CMOS logic levels. The pulses from the transistor Q1, conditioned to meet CMOS logic levels, are further processed by the inverter $IC^3{}_2$, and through the gates $IC^1{}_4$ and $IC^2{}_4$ so that the signal $V_0$ is propagated to the input of the gate $IC^1{}_6$ only if certain input commands are present, as will be described.

Therefore, during the cooking cycle, as long as the oven temperature is below that selected by the actuated pushbutton switch, the resistance of the thermistor Tho will be higher than the resistance of the active potentiometer, so that the level crossing switch $Ic_8$ in the oven module will feed pulses $V_0$ to the transistor Q1, which, as described above, causes the triac Q5 to be activated keeping the oven heating cable 16 energized. As the temperature of the oven reaches the selected level, a balanced condition will be reached, and the voltage crossing switch $Ic_8$ will cease sending pulses $V_0$ to the triac Q5, terminating the current flow through the heating cable 16.

The oven will thereby be regulated and maintained at the preset temperature until the internal temperature of the meat, as designated by the probe Thm reaches a certain level. When that occurs, the relay contacts $C_A$ in FIG. 3 will open and the relay contacts $C_H$ will close, so that no further pulses $V_0$ will be generated by the oven temperature module of FIG. 3 until the oven temperature gradually drops to the holding level of, for example, 138° F. The oven temperature module will now regulate and control the oven temperature to hold it at the level of 138° F until the meat is removed and the system reset.

Figure 4:
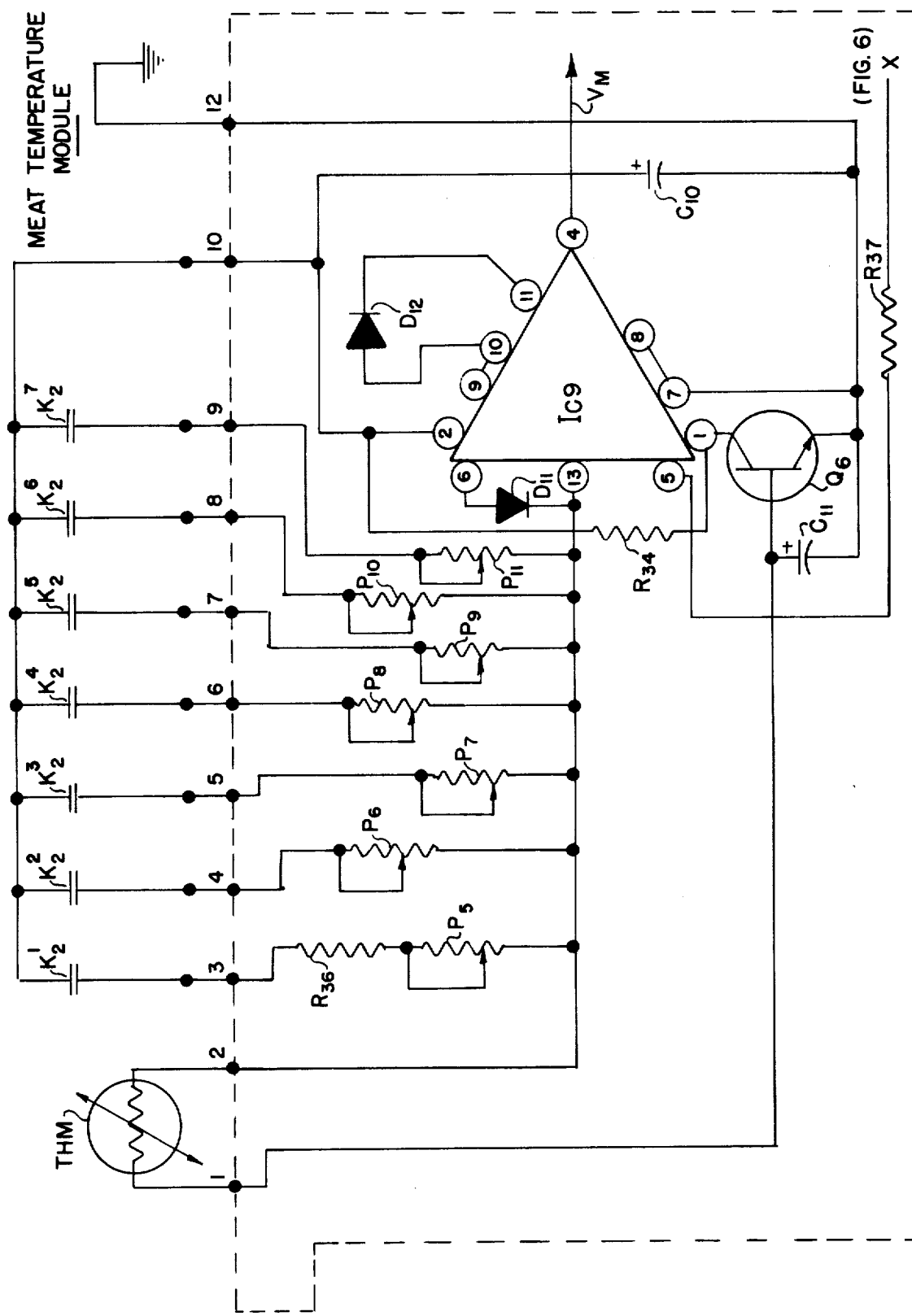
FIG. 4 is a circuit diagram of a meat temperature module which is also included in the control system of the invention, and which provides an indication of the internal temperature of the meat being cooked in the oven.

The meat temperature module of FIG. 4 is generally similar to the oven temperature module of FIG. 3, and it includes a zero crossing switch $Ic_9$ which, together with the zero crossing switch $Ic_8$ of FIG. 3 may be included in the common integrated circuit of the type presently designated CA3059. The meat probe Thm of FIG. 4 is connected to pin 13 of the element $Ic_9$, and to the base of an NPN grounded emitter transistor Q6 which may, for example, be of the type designated 2N3859. A 10 microfarad capacitor C11 is connected between the base and emitter of the transistor Q6.

A diode D11 which may be of the type designated IN4148 is connected across the pins 6 and 13 of element $Ic_9$, and a diode D12 which also may be of the type designated IN4148 is connected between the pins 11 and 10 of the element. The pins 7 and 8 of the element are grounded, and pin 2 is connected to a grounded 220 microfarad capacitor C10. The pin 9 is connected to the pin 10. A 100 kilo-ohm resistor R34 is connected across pins 1 and 2, and the collector of the transistor Q6 is also connected to pin 1. A plurality of 5 kilo-ohm potentiometers P5, P6, P7, P8, P9, P10 and P11 are all connected to pin 13, and to corresponding pushbutton switch contacts $K^1{}_2$, $K^2{}_2$, $K^3{}_2$, $K^4{}_2$, $K^5{}_2$, $K^6{}_2$, $K^7{}_2$, the potentiometer P5 being connected to the contacts $K^1{}_2$ through a 2.2 kilo-ohm resistor R36. The switch contacts are also connected by way of a common lead to the pin 2 of the element $Ic_9$.

So long as the setting of the selected potentiometer P5–P11 is such that the resistance of the selected potentiometer is greater than the resistance of the probe Thm, the element $Ic_9$ will generate pulses $V_M$ at the output pin 4, and these pulses will continue until the resistance of the probe Thm approaches the resistance of the active potentiometer, indicating that the internal temperature of the meat has reached the selected temperature level.

Figure 5:
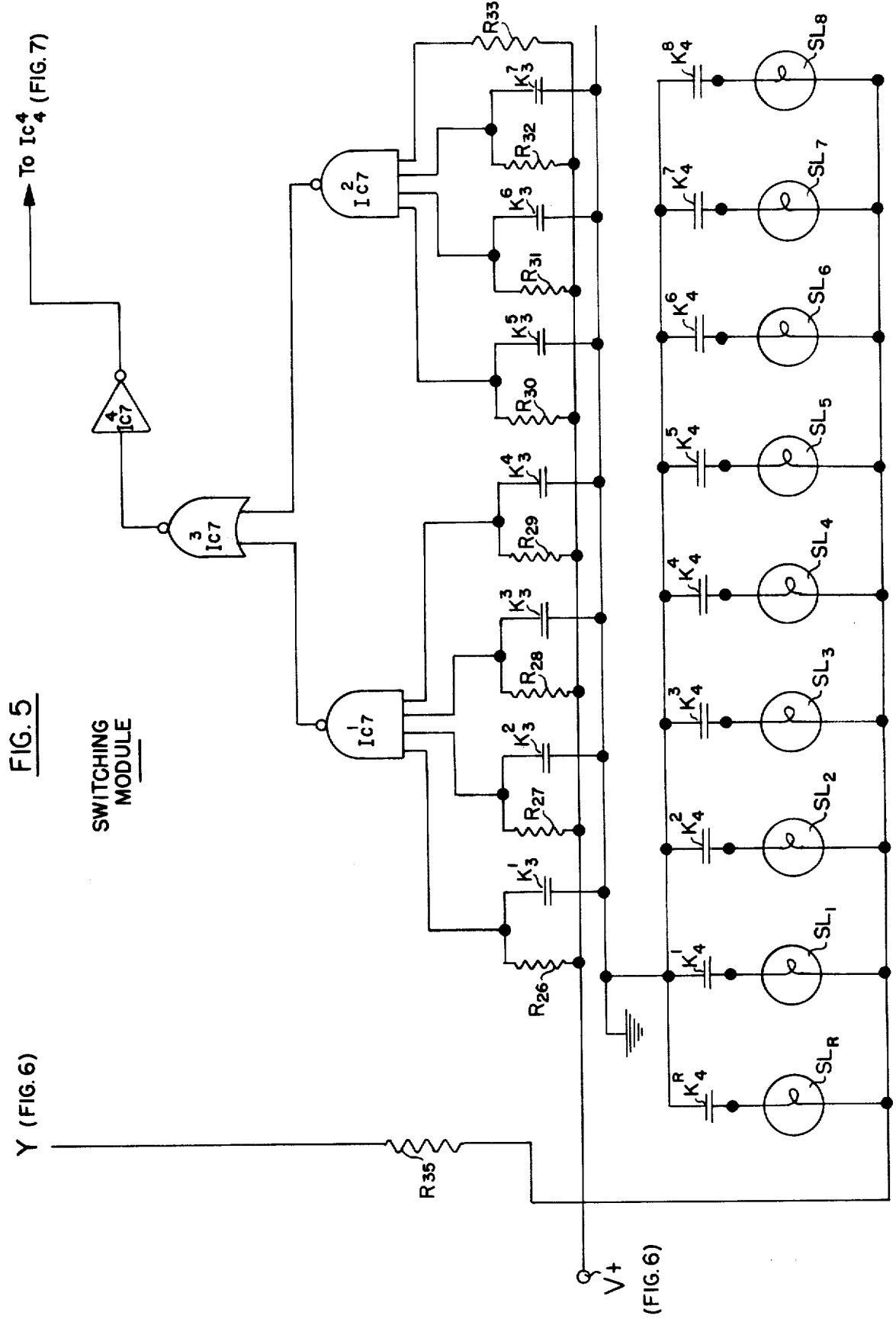
FIG. 5 is a circuit diagram of a switching network which is included in the control system, and certain logic components associated with the switching network.

As shown in FIG. 5, the pushbutton switches $K^1$–$K^8$ also have further sections $K^1{}_3$–$K^7{}_3$ connected to nand gates $IC^1{}_7$ and $IC^2{}_7$ which are connected through a "nor" gate $IC^3{}_7$ to an inverter $IC^4{}_7$ which, in turn, is connected to the nand gate $IC^4{}_4$ of FIG. 7. One side of each of the switch sections $K^1{}_3$–$K^7{}_3$ is grounded, and the other side of each of the switch sections is connected to the nand gates $IC^1{}_7$ and $IC^2{}_7$, as shown. The switch sections $K^1{}_3$–$K^7{}_3$ are also connected to respective 10 kilo-ohm resistors R26–R32 which, in turn, are connected to a positive voltage lead V+ in FIG. 6. A 10 kilo-ohm resistor R33 is also connected between the nand gate $IC^2{}_7$ and the V+ lead.

The pushbutton switches $K^1$–$K^8$, $K^R$ also have sections $K^R{}_4$, $K^1{}_4$–$K^8{}_4$ in FIG. 5 which are connected to ground and to corresponding illuminating lamps $SL_R$, $SL_1$–$SL_8$. The other terminal of each of these lamps is connected through a 15 ohm resistor R35 to the line voltage terminal Y of FIG. 6. The illuminating lamps may be included within the pushbuttons themselves, as is usual practice, and the last-mentioned switch sections cause the corresponding pushbutton to become illuminated when it is actuated. The elements $IC^1{}_7$, $KC^2{}_7$, $IC^3{}_7$ and $IC^4{}_7$ may all be contained within a single integrated circuit of the type presently designated MC14501.

Figure 6:
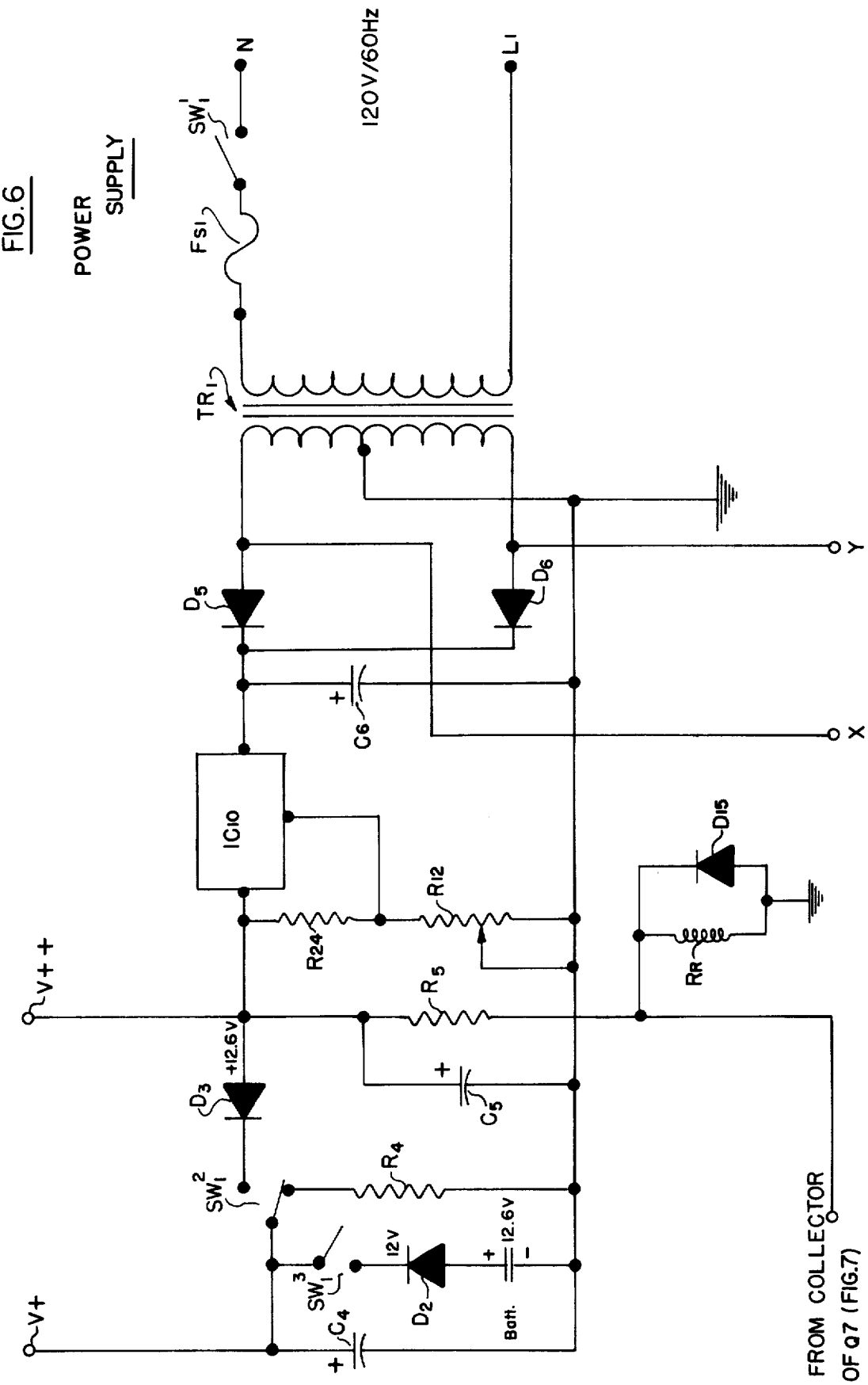
FIG. 6 is a circuit diagram of an appropriate power supply for the control system.

The power supply of FIG. 6 includes a power transformer $TR_1$ which is connected through a section $SW^1{}_1$ of the power switch of the system to a usual 120-volt 60 Hz alternating current source. The secondary of the transformer is connected to a pair of diodes D5, D6, each of which may be of the type presently designated IN5060. The terminals X and Y referred to above are connected to the opposite ends of the secondary of the power transformer $TR_1$, as shown, the center tap of the secondary being grounded. A filter capacitor C6 which may have a capacity of 470 microfarads is connected to the cathodes of the diodes D5 and D6, and to an integrated circuit $Ic_{10}$ which may be of the type designated LM340. A 301 ohm resistor R24 and a 1 kilo-ohm potentiometer P12 are connected between the output of the integrated circuit and ground, and the common junction of the resistor and potentiometer is connected to Grnd pin of the integrated circuit. The output of the integrated circuit $Ic_{10}$ is connected to the terminal V++ which represents a +12.8-volt level. The output is connected to a 1 kilo-ohm resistor R5.

The output of the integrated circuit $Ic_{10}$ is connected through a diode D3 and through a second power switch section $SW^2{}_1$ to an output terminal V+ which represents, for example, a voltage of 12.2-volts. The terminal V+ is connected to a 10 microfarad grounded capacitor C4 and to a further switch section $SW^3{}_1$. The switch section $SW^2{}_1$ has a further terminal connected to a grounded 100 ohm resistor R4, and switch section $SW^1{}_3$ has a further terminal connected through a diode D2 to a battery designated Batt. The diode D2 may be of the type designated IN5060. The resistor R5 is connected to the collector of the transistor Q7 of FIG. 7.

When the switch $SW_1$ is closed, the switch section $SW^1{}_1$ energizes the transformer $TR_1$ so that an alternating current line voltage appears at both the terminals X and Y. This line voltage is rectified and filtered, so that a unidirectional voltage V++ of 12.8-volts appears at the terminal V++. The switch section $SW^2{}_1$ is also closed at this time, as is the switch section $SW^3{}_1$. So long as the transformer $TR_1$ is energized, a unidirectional voltage V+ is achieved at the terminal V+ from the integrated circuit $Ic_{10}$ and no load is placed on the battery. However, should the power fail, the battery voltage will appear at the terminal V+ for emergency purposes.

The control logic system of FIG. 7 includes two flip-flops designated $IC^a{}_{11}$ and $IC^b{}_{11}$, both of which may be formed by an integrated circuit element of the type presently designated CD4012. The flip-flop $IC^a{}_{11}$ produces outputs $Q_A$ and $\overline{Q}_A$, and the flip-flop $IC^b{}_{11}$ produces outputs $Q_H$ and $\overline{Q}_H$. The $\overline{Q}_A$ term is applied to an inverter $IC^3{}_1$ which, in turn, is connected through a buffer $IC^1{}_5$ to an indicating lamp $L_A$. The flip-flop $IC^b{}_{11}$ has its output term $\overline{Q}_H$ introduced through an inverter $IC^6{}_1$, and through a buffer $IC^2{}_5$ to an indicating lamp $L_H$. The indicating lamps $L_A$ and $L_H$ are both connected to the positive lead V++ derived from the power supply of FIG. 6.

The V+ lead from the power supply is connected to a 27 kilo-ohm resistor R3 which is shunted by a diode D1 of the type presently designated IN5060, and the resistor and diode are connected to a 10 microfarad grounded capacitor C3 which is shunted by a reset pushbutton switch designated "Reset". The junction of the aforesaid elements is connected to an inverter $IC^4{}_2$ to the input terminal $R_H$ of the flip-flop $IC^b{}_{11}$, and through a nand gate $IC^2{}_3$ to the input terminal $R_A$ of the flip-flop $IC^a{}_{11}$. The other terminal of the nand gate is connected to the junction of a 10 kilo-ohm resistor R2 and a swtich designated $\overline{H}$, the resistor being connected to the V+ lead, and the switch being connected to ground.

The clock input terminal $CL_A$ of the flip-flop $IC^a{}_{11}$ receives its input from an inverter $IC^2{}_1$ which, in turn, is connected to the output of a nand gate $IC^1{}_3$. The V+ lead is connected to a 10 kilo-ohm resistor R1 which, in turn, is connected to a grounded switch designated $\overline{A}$, the junction of the resistor and switch being connected through an inverter $IC^1{}_1$ to one input terminal of the nand gate $IC^1{}_3$. A grounded 10 microfarad capacitor C1 is also connected to the lead V+.

The $Q_H$ output of the flip-flop $IC^b{}_{11}$ is applied to one terminal of the nand gate $IC^2{}_4$, and the output $Q_A$ of the flip-flop $IC^a{}_{11}$ is applied to the nand gate $IC^1{}_4$. The $\overline{Q}_H$ output of the former flip-flop is applied to a nand gate $IC^3{}_3$ and through an inverter $IC^1{}_2$ and buffer $IC^3{}_5$ to the energizing coil of the relay $RE_H$ which controls the relay contacts $C_H$ in FIG. 3. The energizing coil $RE_H$ is shunted by a diode D7 which may be of the type designated IN4148. The $Q_A$ output of the flip-flop $IC^a{}_{11}$ is introduced, together with the term $\overline{Q}_H$ to a nand gate $IC^3{}_3$, the output of which is connected through an inverter $IC^2{}_2$ and buffer $IC^4{}_5$ to the energizing coil of a relay $RE_A$ which controls the contacts $C_A$ in FIG. 3. The coil $RE_A$ is shunted by a diode D8 which, likewise, may be of the type designated IN4148. The other terminal of each of the energizing coils of the relays $RE_H$ and $RE_A$ are connected to the power lead V++.

It will be understood that the various nand gates, and other solid state elements described above, may be included in known types of integrated circuit elements.

The pulses $V_M$ from the meat temperature module of FIG. 4 are introduced through a 2.2 kilo-ohm resistor R18 to the base of a grounded emitter NPN transistor Q4 which may be of the type designated 2N4424. The pulses $V_M$ appear across a 680 ohm grounded resistor R19. The collector of the transistor Q4 is connected through a 100 ohm resistor R15 to the anode of a silicon controlled rectifier Q3, the cathode of which is connected to a grounded 2.2 kilo-ohm resistor R17. The anode is also connected to a 10 microfarad grounded capacitor C7, to a diode D9 which may be of the type designated IN5060, and to a 1 megohm resistor R13. The diode and resistor are connected through a further 10 kilo-ohm resistor R12 to the power lead V++.

The output from the nor gate $IC_7$ in the switching module of FIG. 5 is introduced to one terminal of a nand gate $IC^4{}_4$, the output of which is passed through a buffer $IC^2{}_6$ to the junction of the resistors R12 and R13. The gate of the silicon controlled rectifier Q3 is connected to the junction of an 18 kilo-ohm resistor R14 and a 22 kilo-ohm grounded resistor R16, the resistor R14 being connected to the positive lead V+. The collector of the transistor Q7 is connected to the resistor R5 of FIG. 6.

When the power switch SW1 of FIG. 6 is turned on, the two flip-flops $IC^a{}_{11}$ and $IC^b{}_{11}$ are each placed in their reset state ($Q_A = 0$ and $Q_H = 0$). If the reset button Reset is left closed when the power is applied, the two flip-flops are triggered to their reset state by causing the input of inverter $IC^4{}_2$ to be low, so that its output, as applied to the reset terminal $R_H$ of the flip-flop $IC^b{}_{11}$ is high. If the reset pushbutton is not actuated when the power is first applied, the capacitor C3 will be charged through the resistor R3, but initially it will introduce a low input to the inverter $IC^4{}_2$ causing it to produce a high output to the reset terminal $R_H$ of the flip-flop $IC^b{}_{11}$, causing the flip-flop to be reset.

The flip-flop $IC^a{}_{11}$ is also reset when the power is first turned on, since its reset terminal $R_A$ is connected to the nand gate $IC^2{}_3$, whose output is high if dissimilar inputs are applied to itsinput terminal. The input terminal connected to the resistor R2 goes high almost instantaneously when the power supply is first turned on and the lead V+ assumes its positive potential; but its other input is low, if the reset pushbutton is actuated, or if it is opened, as described above, thus making the output of the nand gate high, resetting the flip-flop $IC^a{}_{11}$. When the reset button is not actuated, the capacitor C3 subsequently assumes a charge, so that the inputs to the inverter $IC^4{}_2$ and to the nand gate $IC^2{}_3$ become high, thus assuring that the two flip-flops are latched in their reset state until the reset pushbutton is actuated to discharge the capacitor C3.

With the power applied, there is now a choice to set the control system of FIG. 7 either to the Automatic mode or to the Manual Hold mode. If the Manual Hold is selected, the pushbutton switch $\overline{H}$ is momentarily closed. The closure of the switch $\overline{H}$ sets one of the input terminals of the nand gate $IC^2{}_3$, and the input of the inverter $IC^4{}_1$ low. Since at this time the other input terminal of the nand gate $IC^2{}_3$ is high, the closure of the switch $\overline{H}$ causes the output of the nand gate to go high, thereby resetting the flip-flop $IC^a{}_{11}$ if the flip-flop were set, and causing the flip-flop to be unaffected if it were previously in its reset state. The output of the inverter $IC^4{}_1$ goes high when the switch $\overline{H}$ is actuated, and since the output of the inverter is connected to the set input terminal $S_H$ of the flip-flop $IC^b{}_{11}$, the latter flip-flop is set, so that $Q^H = 1$ and $\overline{Q}^H = 0$. The $\overline{Q}^H = 0$ term is introduced to the nand gate $IC^1{}_3$ disabling the nand gate, and thereby disabling the flip-flop $IC^a{}_{11}$.

Therefore, even if the Automatic control pushbutton $\overline{A}$ is depressed at this time, it is ineffective, since the nand gate $IC^1{}_3$ is disabled until the flip-flop $IC^b{}_{11}$ is again reset by first actuating the reset switch. Only then can the Automatic flip-flop $IC^a{}_{11}$ be set by actuating the switch $\bar{A}$.

However, the system can be set to the Automatic mode after the reset pushbutton has been deactivated, by momentarily closing the pushbutton $\bar{A}$. This causes the output of the inverter $IC^1{}_1$ to be high, and in turn causing the output of the enabled nand gate $IC^1{}_3$ to be low, thereby causing the output of inverter $IC^2{}_1$ to be high. The resulting output from the inverter $IC^2{}_1$ acts as a positive-going pulse to latch the flip-flop $IC^a{}_{11}$, thereby setting the flip-flop so that $Q_A = 1$ and $\bar{Q}_A = 0$. However, the Manual Hold mode can be directly selected from the Automatic mode without depressing the reset button. It will be appreciated, therefore, that when the flip-flop $IC^a{}_{11}$ is set, the system is in the Automatic mode, and when the flip-flop $IC^b{}_{11}$ is set, the system is in the Manual Hold mode.

When the Manual Hold mode has been selected, the relay $RE_H$ is energized by $\bar{Q}_H = 0$ being the input to the inverter $IC^1{}_2$ whose output goes low, making the output of buffer $IC^5{}_3$ low, and thereby applying 12-volts to the relay coil $RE_H$. When the relay $RE_H$ is energized, the contacts $C_H$ in the circuit of FIGURE 3 close, and the contacts $C_A$ are opened, so that only the potentiometer P1 is connected into the oven temperature module circuit, to establish the oven at the holding temperature of 138° F. So long as the relay $RE_H$ is energized, the oven will be established as the holding temperature of 138° F by the pulses $V_0$ from the oven temperature module, and will hold that temperature until the circuit is reset. This Manual Hold mode serves to enable the oven of the invention to function as a holding oven, without going through the complete automatic cycle.

The nand gates $IC^1{}_4$, $IC^2{}_4$ $TC^3{}_4$ and $IC^5{}_2$ cause the buffer $IC^1{}_6$ to generate an output for each $V_0$ pulse when either of the two flip-flops is set, so that $(IC^1{}_6)_0 = v_0Q_A + v_0Q_H$. However, when the flip-flops are reset, the pulses $V_0$ are inhibited from reaching the transistor Q7 to actuate the triac Q5. It will be appreciated that due to the inverters $IC^3{}_1$ and $IC^6{}_1$, the indicator light $L_A$ is illuminated when the flip-flop $IC^a{}_{11}$ is set, indicating the Automatic mode, and the lamp $L_H$ is illuminated when the flip-flop $IC^b{}_{11}$ is set, indicating the Manual Hold mode. These indicating lights may be associated with the respective pushbuttons $\bar{A}$ and $\bar{H}$.

In the Automatic mode, the meat probe Thm of FIG. 4, which preferably if formed of stainless steel, is inserted into the meat in the oven, and one of the pushbuttons $K^1$-$K^8$ is actuated to represent a selected state to which the meat is to be cooked. If the power switch SW1 is turned on, and if the control of FIG. 7 was not previously set to the Manual Hold mode, then the control can be set to the Automatic mode by temporarily depressing and illuminating the pushbutton switch $\bar{A}$. By so doing, the input to the inverter $IC_1$ is brought temporarily to the low state, and the nand gate $IC^1{}_3$ is conductive, due to the fact that $\bar{Q}_H = 1$, so that the flip-flop $IC^a{}_{11}$ may be set, and $Q_A = 1$ and $\bar{Q}_A = 0$. The lamp $L_A$ now becomes illuminated, and remains illuminated so long as the flip-flop $IC^a{}_{11}$ is set, showing that the system is in the Automatic mode.

The nand gate $IC^3{}_3$ now becomes conductive, because its input terms $\bar{Q}_H = 1$, and $Q_A = 1$, so that the relay $RE_A$ is energized, causing the relay contacts $C_A$ in the oven temperature module of FIG. 3 to close. This causes one of the potentiometers P2, P3, P4, as selected by the actuated one of the pushbutton switches $K^1$-$K^8$, so that the oven module generates pulses $V_0$ which energizes the oven and brings it up to the temperature corresponding to the setting of the activated potentiometer.

Also, the actuation of the selected one of the switches $K^1$-$K^8$ connects a corresponding one of the potentiometers P5-P11 into the circuit of the meat temperature module of FIG. 4 which determines the temperature of the meat probe thermistor Thm, at which the zero crossing switch $Ic_9$ will cease sending its output pulses $V_M$.

When none of the switches $K^1$-$K^7$ is actuated, a low input to the corresponding gate $IC^1{}_7$ in FIG. 5 occurs, resulting in the input of the buffer $IC^2{}_6$ in FIG. 7 being high, so that its output goes low effectively to ground the junction of resistors R12, R13 and diode D9. This prevents capacitor C7 from being charged when none of the switches $K^1$-$K^7$ are actuated. However, when any one of the switches $K^1$-$K^7$ is actuated, the reverse condition occurs, so that capacitor C7 may be charged. At the same time, the zero crossing network $Ic_9$ in the meat temperature module of FIG. 4 is generating the pulses $V_M$, and introducing the pulses to the base of the grounded emitter transistor Q4 in FIG. 7. The pulses $V_M$ may occur, for example, every 8.3 milliseconds, and each pulse may have a duration of 100 microseconds. Each $V_M$ pulse saturates the transistor Q4 clamping the voltage across the capacitor C7 to a value of, for example, 0.2 volts, thus preventing the capacitor from charging.

Thus, the oven temperature module of FIG. 3 will maintain the oven temperature by turning the triac Q5 on and off and, at the same time, the meat temperature module of FIG. 4 will send pulses $V_M$ to the transistor Q4 so long as the meat core temperature is lower than the preset temperature. However, once the meat core temperature reaches the preset temperature, the zero crossing switch $Ic_9$ in the circuit of FIG. 4 will stop generating the pulses $V_M$, and the transistor Q4 will become non-conductive. At the same time, the output from the buffer $IC^2{}_6$ is high, because one of the pushbutton switches $K^1$-$K^7$ has been actuated, so that the capacitor C7 begins to charge.

After 10 seconds without any pulses being derived from the $Ic_9$ output, the capacitor C7 reaches a voltage equal to the voltage preset by the voltage divider R14, R16, applied to the anode-gate of the programmable junction transistor Q3. This permits the transistor Q3 to fire, and discharge the capacitor C7, thereby developing a voltage spike across the cathode resistor R17. This pike is in-roduced to the base of a grounded emitter NPN transistor Q2 through a 220 ohm resistor R10, whose collector is connected to the V + + lead through a 10 kilo-ohm resistor R9, and whose collector is also connected to the inverter $IC^6{}_2$.

When the voltage spike appears across the cathode resistor R17, the output of the inverter $IC^6{}_2$ goes high, and since the nand gate $IC^4{}_3$ is enabled by the term $Q_A$, its output goes low, causing the output of the inverter $IC^5{}_1$ to go high, thereby setting the flip-flop $IC^b{}_{11}$, so that $Q_H = 1$ and $\bar{Q}_H = 0$. The relay $RE_A$ now drops out, and the relay $RE_H$ is simultaneously energized, so that the potentiometer P1 of the oven temperature module of FIG. 3 is activated as the relay contacts $C_H$ close, and the previously activated potentiometer P2, P3 or P4 is de-activated, as the relay contacts $C_A$ open.

The oven is now set to its holding state, and its temperature gradually cools to the holding temperature of 138° F, cooking the meat as it cools. Once the holding temperature is reached, the oven is maintained at that temperature, holding the meat until required.

Therefore, when the system is set to the Automatic mode, the oven temperature is brought up to a particular temperature level, and is held at that level until the internal meat temperature reaches its particular level. When the latter condition is reached, the system is switched to the Manual Hold condition, and the oven temperature gradually drops to the hold temperature as the meat is being cooked, and it then remains at the hold temperature until the system is reset. It will be appreciated that the lamp $L_A$ will be illuminated so long as the system is in the Automatic mode, and the lamp $L_H$ will be illuminated when the system is in the Hold mode. As mentioned above, the control system remains in the Hold mode until it is reset by actuating the reset pushbutton switch.

In the case of a power failure during the manual operation, the auxiliary power supply "Batt." maintains the selected state of the control system before the power failure. This provides a non-destructive memory capability for the system. Closure of the switch contacts $K^b{}_4$ in the switching module of FIG. 5 keeps the timer capacitor C7 discharged by the low output of the buffer $IC^2{}_6$, so that the oven temperature may be held at the level set without being interrupted by the meat temperature probe Thm. The switch contacts $K^R{}_4$ in the switching module of FIG. 5, when actuated, serve to illuminate the transparent tags inside the meat selector pushbutton switches upon their activation, by the lamp designated SLR. This provides a better visual indication of the meat process selected. Both the oven temperature and meat temperature modules are fail-safe, stopping their operation upon either the thermistor Tho or the probe Thm being open-circuited or short-circuited.

While a particular embodiment of the invention has been shown and described, modifications may be made. It is intended in the claims to cover the modifications which come within the spirit and scope of the invention.

What is claimed is:

1. A control system for an electric meatcooking oven for controlling the current flow in an electric heating cable associated with the oven, the control system including: switching means connected in circuit with the cable and a source of energizing electric current; an oven temperature module for generating an output signal so long as the oven temperature is below a pre-set temperature level; a meat temperature module for generating an output signal so long as the internal temperature of the meat being cooked in the oven is below a pre-set cooking temperature level; electric circuitry connecting said oven temperature module and said meat temperature module to said switching means and having an automatic mode in which said switching means is controlled to permit current flow through the cable until the pre-set oven temperature is reached and thereafter to control the current flow in the cable to maintain the oven at the pre-set oven temperature until the pre-set internal temperature of the meat is reached; switching circuitry connecting said electric circuitry to the oven temperature module to cause the oven temperature module to generate its output signal in said automatic mode only when the oven temperature falls below a pre-set holding temperature lower than said pre-set cooking temperature level, after said pre-set internal temperature of the meat has been reached; said electric circuitry also including manually controlled logic circuit means to set the system to its automtic mode, and alternately to set the system to a manual mode in which the circuitry is independent of the output of the meat temperature module so that the oven is established at the pre-set temperature by said oven temperature module; and manually controlled switching means connected to said oven temperature module and to said meat temperature module for setting the oven temperature module and the meat temperature module to different pre-set temperature levels.

2. The control system defined in claim 1, in which said meat temperature module includes a temperature probe to be inserted into the meat being cooked in the oven.

3. The control system defined in claim 1, in which the output signal generated by said oven temperature module and by said meat temperature module are in the form of pulses.

4. The control system defined in claim 3, and which includes a power supply energized by an alternating current electric line; and in which the oven temperature module and the meat temperature module each include a zero crossing switch to cause the pulses to occur at zero voltage crossings of the voltage of said alternating current electric line so as to reduce switching transient noises.

5. The control system defined in claim 1, and which includes an auxiliary battery source to maintain the system in a predetermined mode in the event of power failure.

6. The control system defined in claim 1, in which the oven temperature module and the meat temperature module each have thermistor-type temperature sensing element connected to the corresponding module to cause the corresponding module to generate its output signal onlywhen the apparent resistance of the sensor is in a predetermined range, so as to present the generation of an output signal when the corresponding sensor is short-circuited or open-circuited.

* * * * *